A. F. POOLE.
SPEED INDICATOR FOR AEROPLANES.
APPLICATION FILED MAY 31, 1918.

1,422,224.

Patented July 11, 1922.
2 SHEETS—SHEET 1.

Inventor:
Arthur F. Poole.

A. F. POOLE.
SPEED INDICATOR FOR AEROPLANES.
APPLICATION FILED MAY 31, 1918.
1,422,224.
Patented July 11, 1922.
2 SHEETS—SHEET 2.
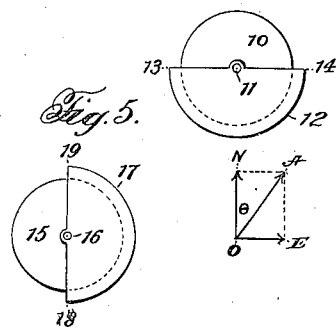
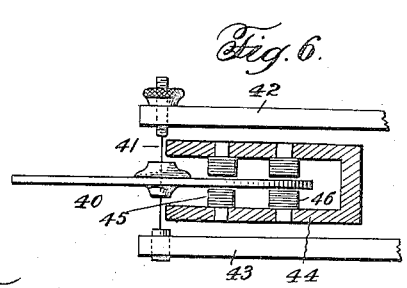
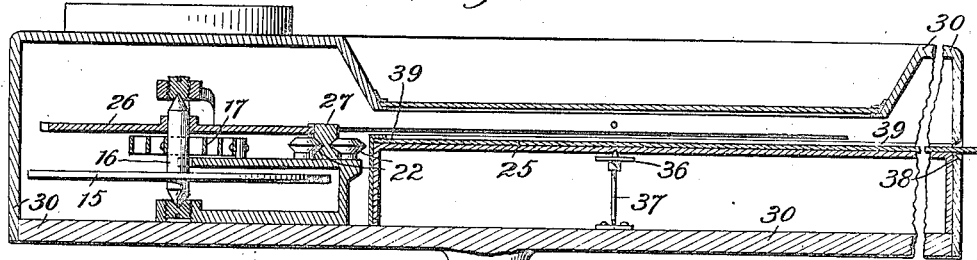
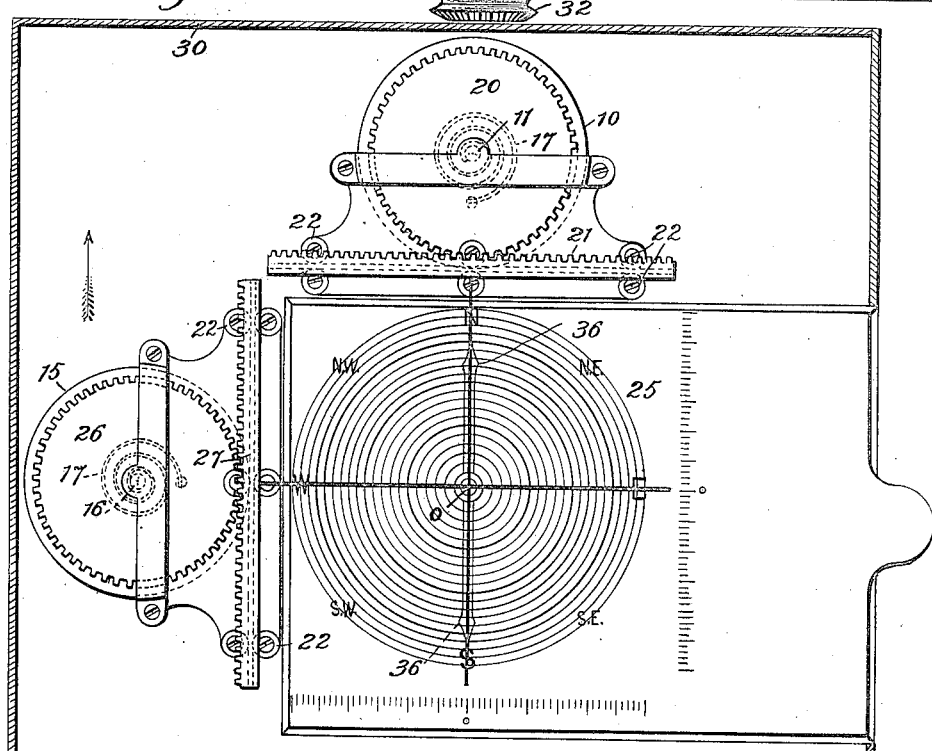

UNITED STATES PATENT OFFICE.

ARTHUR F. POOLE, OF KENILWORTH, ILLINOIS.

SPEED INDICATOR FOR AEROPLANES.

1,422,224.                     Specification of Letters Patent.     Patented July 11, 1922.

Application filed May 31, 1918. Serial No. 237,585.

*To all whom it may concern:*

Be it known that I, ARTHUR F. POOLE, a citizen of the United States, residing at Kenilworth, in the county of Cook and State of Illinois, have invented certain new and useful Improvements in Speed Indicators for Aeroplanes, of which the following is a specification.

My invention is a speed indicator, the preferable use for which is in connection with aeroplanes, although it may be used to indicate the speed of other bodies moving at a velocity relative to the surface of the earth.

Numerous attempts have been made to obtain a speed indicator giving the relative velocity of an aeroplane to the earth. The problem is a somewhat difficult one from the fact that prior to my present invention all such indicators depended on the velocity of the aeroplane in reference to the surrounding air.

The difficulty of solving this problem arises from the fact that the plane is in the air, out of contact with any object fixed relative to the earth.

It is well known that the earth is surrounded by a magnetic field, which for any given time and position is constant in magnitude and direction. This magnetic field has long been used for the determination of direction as evinced by the mariner's compass. It is the object of my present invention to employ this magnetic field for the determination of both the speed and the direction of the plane itself, and to this end I have devised the apparatus described in the following specification.

My herein described speed indicator depends for its operation on the principle that if a conductor is moved through a magnetic field, eddy currents will be produced in this conductor and will by their reaction on the magnetic field produce a drag of the conductor. Accordingly I have provided a disc of aluminum, or other conductor of electricity, have pivoted this disc at its center and have shielded one-half of it by a magnetic shield, such as an iron casing. As the disc is then moved through the earth's magnetic field, it will be subject to a torque which will be proportional to the velocity with which the disc is moved through the earth's magnetic field. This torque, which manifests itself in a deflection of the disc from its zero position, may then be read. In the use of a single disc as above outlined, it is necessary to take into account the direction of the plane relative to the earth, since the amount of torque will depend on the angle made by the shielded portion of the disc with the direction of motion of the plane.

In order to eliminate the necessity of taking into account the direction of the plane's velocity, I have provided two discs having their shields at right angles to each other, and then have combined the deflections of these two discs to give a single indication on the dial from which the velocity of the plane and the direction of its movement may be read.

My invention will be best understood by reference to the accompanying figures, of which—

Fig. 2 is a top view of the speed-indicating apparatus;

Fig. 4 is a section along the line 4—4 of Fig. 2;

Fig. 5 is a diagrammatic view of the position of the disc and the magnetic field, and Fig. 6 shows a modified method of supporting the conducting discs.

Figure 1:
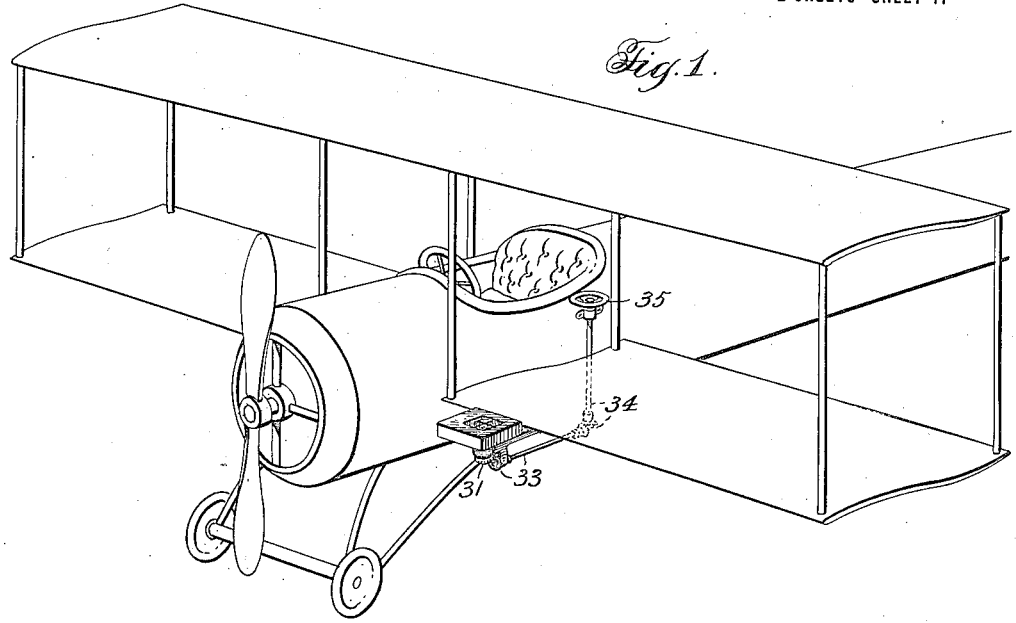
Fig. 1 is a diagrammatic view of the plane, showing the position of the speedometer.

Before giving a description of the apparatus itself, I will give a brief outline of its theory of operation.

Referring to Fig. 5, 10 is an aluminum disc, pivoted at 11 and held in a normal position by a spring (not shown). Half of this disc is surrounded by a magnetic shield 12, having its diameter 13—14 extending east and west. Similarly 15 is a disc, pivoted at 16, held in normal position by a spring (not shown), and having half of said disc surrounded by a magnetic shield 17, having its diameter pointing north and south.

Obviously if the two discs shown in Fig. 5 are moved through the earth's magnetic field in a direction east and west, the disc 15 will not be affected, since the torques on either side of the pivot 16 will balance each other.

The disc 10, however, will be affected to its fullest extent, since all of the torque will come on the same side of the pivot 11.

If the two discs 10 and 15 are moved through the earth's field in a north and south direction, the disc 10 will not be affected and the disc 15 will be affected to its fullest extent.

The two discs are mounted on an aeroplane in a rotary framing which is associated with a compass, and when it is desired to make a reading of the speed, the framing is turned so that the line 13—14 points east and west.

Referring now to the small diagram in the corner of Fig. 5, let OA be a vector corresponding in magnitude and direction to the velocity of the plane. Obviously this velocity may be resolved into two components,— ON directed north, and OE directed east. Let the vector OA make an angle θ with the north and south line ON. Then ON, the component north and south, will be equal to OA cos θ, and OE, the component of OA directed east and west, will be equal to OA sin θ. Obviously $$OA = \sqrt{ON^2 + OE^2}$$

and $$\tan \theta = \frac{OE}{ON}.$$

As noted above, the disc 10 will be deflected through an angle proportional to the velocity east and west, and the disc 15 will be deflected through an angle proportional to the velocity north and south or the vector ON.

I shall now describe the means by which these two deflections are combined with an indicating dial which will give the direction and magnitude of the vector OA, which, as before noted, is proportional to the velocity of the plane through the earth's magnetic field, or proportional to the velocity of the plane relative to the earth itself.

Figure 3:
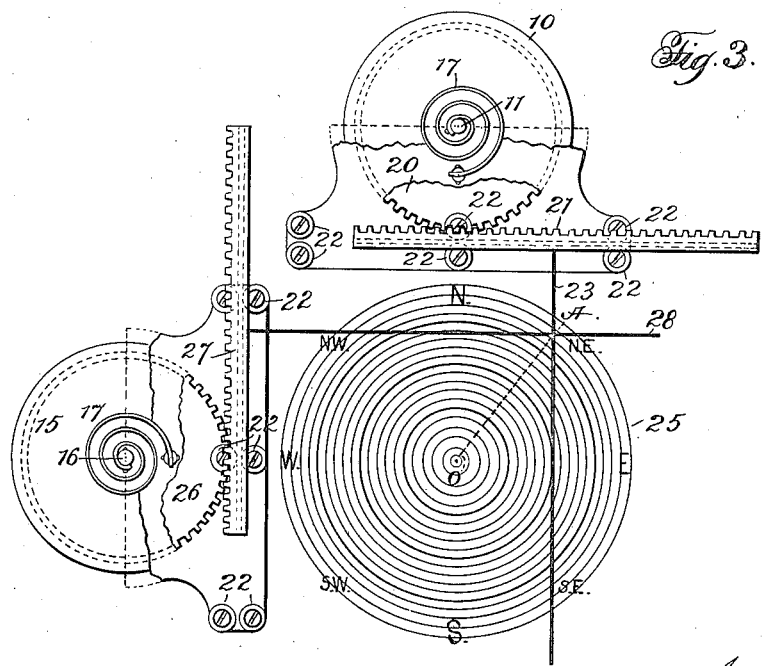
Fig. 3 is a partial view of the dials showing the indicating needles in a displaced position.

Referring to Fig. 3, it will be seen that I have provided the shaft 11 with a gear wheel 20, which engages a light rack 21, slidably mounted between rollers 22 in the framework. Attached to the rack 21 is a light pointer 23 which travels over the indicating dial 25. Similarly I have provided the shaft 16 with a gear 26 engaging a rack 27 similarly mounted to the rack 21 and carrying a light pointer 28. The shafts 11 and 16 are so arranged in reference to the dial 25 that the angle suspended by these shafts from the center of the dial is a right angle of 90°. The dial 25 is provided with a series of concentric circles and is read by noting the point of intersection of the pointers 23 and 28. Obviously the pointer 28 is displaced from its zero position proportional to the north and south component of the plane's velocity and the point 23 is displaced from its zero position proportional to the east and west component of the plane's velocity. The length of the line OA on the dial 25 will evidently correspond to the velocity of the plane and the angle which this line makes with ON will evidently correspond to the direction of motion of the plane itself.

The discs 15 and 10 may be deflected in either a positive or a negative direction, thus locating the intersection of the pointers 23 and 28 in any one of the four quadrants and giving an indication of the magnitude and direction of the plane's velocity regardless of the direction in which it may be going.

It will be noted that since the axes 11 and 16 of the discs 10 and 15 are placed at right angles to the axis of the aeroplane, it will be necessary when taking a speed indication to have the aeroplane flying in an approximately horizontal direction. The procedure in taking an observation of the direction and the speed of the plane is as follows:

By means hereinafter to be described, the discs 10 and 15 are turned relative to the plane, so that the line 13—14 is east and west, and the line 18—19 is north and south. The plane is then held horizontal and the point of intersection of the pointers 23 and 28 is noted. The circle over which these pointers intersect will give a reading of the speed, and an imaginary line drawn from the center of the dial to this point of intersection will give the direction of motion of the plane.

Having described the theory of operation of my improved indicator, I shall now describe the details of its structure.

The two discs 10 and 15 are mounted in a casing 30, which is rotatably mounted on a shaft 31, to which is attached a bevel gear 32, which, by means of bevel gears and shafts 33 and 34 leads to a hand wheel 35 in the control of the aviator. The dial 25 is made of some transparent material, such as celluloid, and underneath of said dial, pivoted with its center at O, is a compass needle 36, pivoted on a shaft 37. The apparatus will then be turned until the compass needle 36 points to north on the dial 25. The disc 15 is shown in section in Fig. 4, and has mounted on its shaft 16 a suitable hair spring 17 and a gear 26. The disc 10 is similarly mounted and it will not be necessary to describe the mounting of this second disc, since it is exactly like the mounting of the disc 15. The gears 20 and 26 are of course made of some material which is not a conductor of electricity, such, for instance, as fibre, or they may be of metal and slotted to avoid eddy currents. For the same reason, the area of the racks 21 and 27 should be as small as consistent with strength.

It is to be noted that the amount of deflection which can be obtained is wholly a question of the size of the discs 10 and 15. The amount of torque on these discs will increase as the cube of the radius of the disc, since the drag on the discs will increase as the square of the radius of the disc and the moment of this drag corresponding to the torque will also increase as the radius. Consequently, the effective torque will increase as the cube of the radius of the discs 15 and 10.

The magnetic field of the earth changes both in intensity and direction from place to place; also from time to time. With a view of easily calibrating this instrument to take into account these changes, I have made the dial 25 of transparent material and have arranged it so that it can be withdrawn from the instrument and another dial substituted. Since it is obvious that a change in the intensity of the vertical component of the earth's field will change the deflection of the discs 10 and 15, due to a given velocity, this variation can be easily taken care of by providing a plurality of dials 25, having on them circles of different size, and labeling these various dials to correspond with the various intensities of the vertical component of the earth's magnetic field. In using this instrument in any given place, it will be necessary to determine the value of the horizontal component of the earth's field and then insert a dial to correspond into the instrument.

In order to afford an easy means of inserting these dials, I have provided a hole 38 in the casing 30, and have provided suitable grooves 39 to hold the dial 25 in place.

It is of course obvious that this device will not work in a place where the direction of the earth's field is horizontal. However, since one of the important uses of this device will be to give an indication of the velocity and direction of the plane's motion for the purpose of throwing bombs, a use which is confined to portions of the earth's surface distant from the equator will be a sufficient use to make it of great advantage.

For the sake of simplicity, I have shown the discs 15 and 10 mounted on shafts 16. This form of mounting will answer in the event the discs 10 and 15 are made very light. A better way of mounting the discs than that of mounting them on shafts, is to mount the discs in the center of a wire extending between two fixed supports. When this expedient is adopted, the friction of the pivots 11 and 16 will be entirely avoided and the wire will replace the hair spring 17.

It is of course advisable to dampen the motion of the discs so that they will not vibrate and this may be readily accomplished by providing them with permanent magnets located within the magnetic shields 12 and 17. The disc may be thus dampened to any required extent.

In Fig. 6 I have shown a disc 40 mounted in the center of a wire 41, which is held between fixed supports 42 and 43 surrounded by a magnetic shield 44 in the interior of which are damping magnets 45 and 46.

It is of course obvious that the pointers 23 and 28 could be attached directly to the disc itself. In this event, the velocity lines on the dial 25 would not be circles, but would be distorted ellipses.

I believe I am the first to make a speed indicator depending for its operation on the drag of a conducting body moved through the earth's magnetic field, and further in combining two of such indicators to give an indication of the velocity and direction of motion and wish to claim the same broadly.

Many variations may be made from the precise structure herein shown without departing from the spirit of my invention, since I claim:

1. The method of determining the speed of travel of navigable vehicles through a non-conducting medium, said method consisting in associating with said vehicle a part capable of being influenced by the earth's magnetic field and moving said part through said magnetic field, whereby the part will be variably shifted by the influence exerted thereon by the magnetic field to give indications.

2. In a speed indicator, the combination of a moving body, a conductor mounted on said moving body and adapted to be moved through the earth's field with said moving body, whereby eddy currents are produced in said conductor, and means for determining the drag of said eddy currents on said conductor.

In witness whereof I have hereunto subscribed my name.

ARTHUR F. POOLE.